United States Patent
Portisch et al.

(10) Patent No.: US 11,907,182 B2
(45) Date of Patent: Feb. 20, 2024

(54) SCHEMA-BASED DATA RETRIEVAL FROM KNOWLEDGE GRAPHS

(71) Applicant: SAP SE, Walldorf (DE)

(72) Inventors: Jan Portisch, Bruchsal (DE); Sandra Bracholdt, Dielheim (DE); Volker Saggau, Bensheim (DE)

(73) Assignee: SAP SE, Walldorf (DE)

( * ) Notice: Subject to any disclaimer, the term of this patent is extended or adjusted under 35 U.S.C. 154(b) by 156 days.

(21) Appl. No.: 17/470,988

(22) Filed: Sep. 9, 2021

(65) Prior Publication Data
US 2023/0073312 A1    Mar. 9, 2023

(51) Int. Cl.
*G06F 16/21*    (2019.01)
*G06F 16/28*    (2019.01)

(52) U.S. Cl.
CPC .......... *G06F 16/211* (2019.01); *G06F 16/285* (2019.01)

(58) Field of Classification Search
CPC .. G06F 16/211; G06F 16/2423; G06F 16/248; G06F 16/285; G06F 16/332; G06F 16/3338; G06F 16/367; G06F 16/9024; G06N 5/02; G06N 5/022
See application file for complete search history.

(56) References Cited

U.S. PATENT DOCUMENTS

| | | | | |
|---|---|---|---|---|
| 7,558,791 B2 * | 7/2009 | Wahl | ...................... | G06F 16/258 |
| 8,631,048 B1 * | 1/2014 | Davis | ...................... | G06F 16/211 |
| | | | | 707/803 |
| 10,157,226 B1 * | 12/2018 | Costabello | ............. | G06N 5/022 |
| 2005/0234889 A1 * | 10/2005 | Fox | ...................... | G06F 16/2471 |
| 2006/0167927 A1 * | 7/2006 | Edelstein | ................ | G06F 16/25 |
| | | | | 707/999.102 |
| 2007/0185868 A1 * | 8/2007 | Roth | ...................... | G06F 16/81 |
| 2011/0093469 A1 * | 4/2011 | B'Far | ...................... | G06F 16/254 |
| | | | | 707/754 |
| 2012/0179644 A1 | 7/2012 | Miranker | | |
| 2012/0226716 A1 * | 9/2012 | Yeh | ........................ | G06N 5/02 |
| | | | | 707/E17.012 |
| 2013/0318070 A1 | 11/2013 | Wu et al. | | |
| 2014/0059043 A1 | 2/2014 | Sundara et al. | | |
| 2015/0169709 A1 | 6/2015 | Kara et al. | | |

(Continued)

FOREIGN PATENT DOCUMENTS

| | | |
|---|---|---|
| EP | 2755148 A1 | 7/2014 |
| WO | WO2021/0126154 A1 | 6/2021 |

OTHER PUBLICATIONS

Hertling et al., "MELT—Matching Evaluation Toolkit," M. Acosta et al. (Eds.): SEMANTiCS 2019, LNCS 11702, pp. 231-245, 2019. Available at: https://doi.org/10.1007/978-3-030-33220-4_17.

(Continued)

*Primary Examiner* — Robert W Beausoliel, Jr.
*Assistant Examiner* — Cheryl M Shechtman
(74) *Attorney, Agent, or Firm* — Klarquist Sparkman, LLP

(57) ABSTRACT

A computer-implemented method includes receiving a request of data records for a data schema, obtaining a schema alignment which maps the data schema to a subset of an ontology of a knowledge graph, generating at least one query based on the subset of the ontology of the knowledge graph, obtaining a list of data records by executing the at least one query on the knowledge graph to obtain a list of data records, and persisting the list of data records to the data schema.

18 Claims, 15 Drawing Sheets

(56) References Cited

U.S. PATENT DOCUMENTS

2016/0224645 A1* 8/2016 Dang .................... G06F 16/254
2016/0283527 A1* 9/2016 Vandiver ................ H04L 63/20
2020/0349129 A1 11/2020 Bracholdt et al.
2020/0349130 A1 11/2020 Bracholdt et al.
2020/0409931 A1* 12/2020 Zang ................... G06F 16/2365

OTHER PUBLICATIONS

Heiko Paulheim, "Knowledge Graph Refinement: A Survey of Approaches and Evaluation Methods," Semantic Web, 8 (3). pp. 489-508. IOS Press. 2016. Available at: http://www.semantic-web-journal.net/system/files/swj1167.pdf.

Portisch et al., "Wiktionary Matcher Results for OAEI 2020," In: The Fifteenth International Workshop on Ontology Matching collocated with the 19th International Semantic Web Conference ISWC. 2020. Available at: http://ceur-ws.org/Vol-2788/oaei20_paper14.pdf.

"Communication—Extended European Search Report" from the European Patent Office for European Application No. EP22194498.6-1203, dated Feb. 6, 2023, 10 pages.

Krause, et al., "An SQL-Based Query Language and Engine for Graph Pattern Matching," SAT 2015 18th International Conference, Austin, Texas, Sep. 24-27, 2015, Springer, Berlin Heidelberg, Germany, Jun. 22, 2016, pp. 153-169.

* cited by examiner

```
METHOD Set<Attribues> getIndependentAttributes(Schema s):
    Set<Attributes> result = new Set()
    FOR structure IN s.getStructures():
        IF structure.isIndependent():
            result.addAll(structure.getAllAttributes())
    RETURN result
```
← 700

```
METHOD Set<Attribues> getAllAttributes(Structure s):
    Set<Attributes> result = new Set()
    FOR element IN s:
        IF element.isStructure():
            result.addAll(getAllAttributes(element))
        ELSE:
            result.add(element)
    RETURN result
```
← 710

FIG. 7

```
SELECT DISTINCT ?label WHERE {
    ?s wdt:P734 ?o .          ⎫
    ?o rdfs:label ?label .    ⎬ 802
    FILTER (LANG(?label) = "en") . ⎭ 806
} LIMIT 10  808
```
804 ──┘

```
SELECT ?Name ?Country ?Industry WHERE {
    ?s wdt:P31 wd:Q891723 .
    ?s wdt:P17 ?countrynode .
    ?countrynode rdfs:label ?Country .
    ?s wdt:P452 ?industrynode .
    ?industrynode rdfs:label ?Industry .
    ?s rdfs:label ?Name .
    FILTER(LANG(?Name) = 'en' ) .
    FILTER(LANG(?Country) = 'en' ) .
    FILTER(LANG(?Industry) = 'en' ) .
}
LIMIT 10
```

FIG. 9

| Name | Country | Industry |
|---|---|---|
| Honda | Japan | Automotive industry |
| Nissan | Japan | Automotive industry |
| Ube Industries | Japan | Heavy industry |
| NEC | Japan | Information technology |
| FANUC | Japan | Manufacturing |
| NEC | Japan | Electronics |
| Agnico-Eagle Mines | Canada | Mining |
| Canadian Pacific Railway | Canada | Logistics |
| Nintendo | Japan | Video game industry |
| International Airlines Group | Spain | Air travel |

```
IF allowForDuplicates AND generatedRecords.size() < recordNumber :
    WHILE generatedRecords.size() < recordNumber:
        generatedRecords.add(randomCopyRecord(generatedRecords))
```

1100

| Employee | | |
|---|---|---|
| Given name | Family name | Gender |
| Sabine | Bendieck | Female |
| Klein | Christian | Male |
| Jan Phillip | Portisch | Male |
| Jan Phillip | Klein | Female |

| Company | | |
|---|---|---|
| Name | Country | Industry |
| SAP SE | Germany | Software industry | ← 1310
| BASF | Germany | NULL | ← 1320
| SAP SE | Germany | Software industry | ← 1330

1300

SCHEMA-BASED DATA RETRIEVAL FROM KNOWLEDGE GRAPHS

BACKGROUND

Data is essential for enterprises. For example, machine learning and/or artificial intelligence often require a large amount of realistic or real data to train, tune, and/or improve the underlying algorithms. Although data scientists know what kind of data they need, they may have to spend a lot of effort to find and obtain such data. As another example, realistic or real data is often essential for testing software systems and for creating demonstrations. Although enterprises may have access or even "own" a lot of data, such data is often not broadly accessible internally. For example, a bank is unlikely to use its own customer database to test scale-out scenarios on a newly acquired enterprise database. Similarly, internal data may not be easily used for public purposes (e.g., preparing demonstrations, etc.) due to privacy concerns. Thus, room for improvements exists for automatic retrieval of realistic or real data from online data sources.

BRIEF DESCRIPTION OF THE DRAWINGS

FIG. 7 depicts an example pseudo-code implementation of a method that determines value-independent attributes in a data schema.

FIG. 8 depicts an example value-independent query that is automatically generated to retrieve corresponding data records from a knowledge graph.

FIG. 9 depicts an example value-dependent query that is automatically generated to retrieve corresponding data records from a knowledge graph.

FIG. 10 depicts an example list of query results obtained after executing a value-dependent query on a knowledge graph.

FIG. 11 depicts an example pseudo-code implementation of a method of generating duplicates of data records obtained after executing a value-dependent query.

FIG. 12 depicts an example list of composed data records obtained after executing value-independent queries on a knowledge graph.

FIG. 13 depicts an example list of ranked data records obtained after executing a query on a knowledge graph.

DETAILED DESCRIPTION

Example 1—Overview of Data Retrieval

Figure 1:
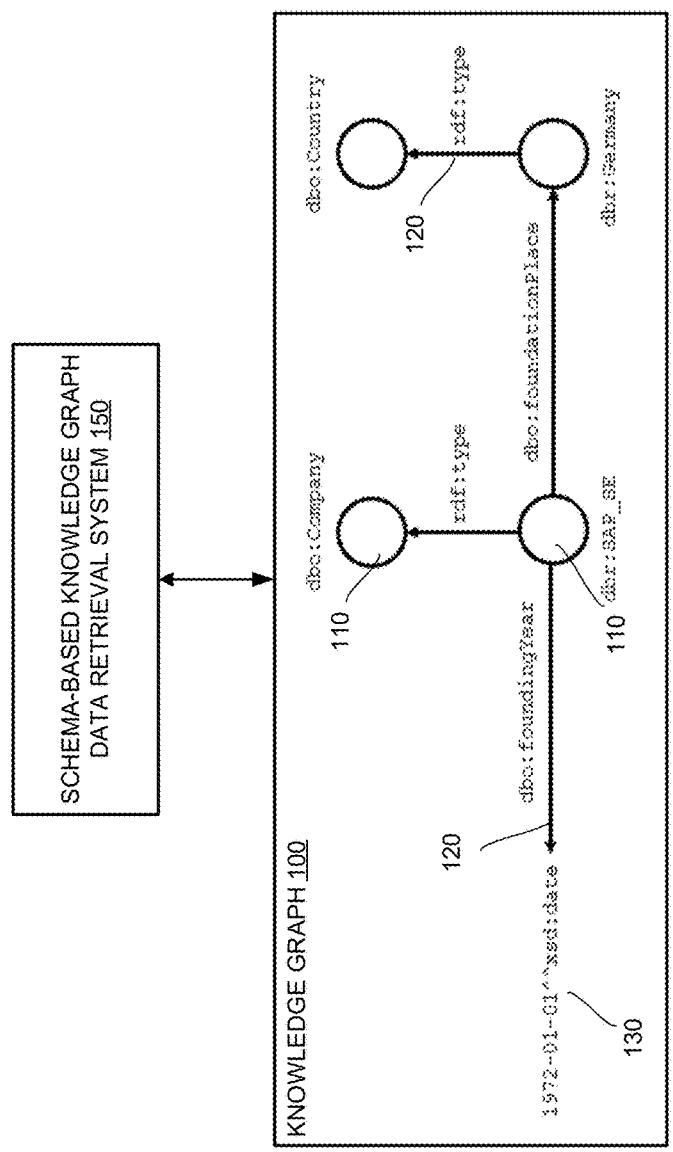
FIG. 1 is an example diagram illustrating a portion of an example knowledge graph and a schema-based knowledge graph data retrieval system interacting with the knowledge graph.

Real and/or realistic data records are essential for enterprises. As described herein, real data records refer to data records obtained by direct measurement of real-world objects (e.g., physical objects) and realistic data records refer to synthetic data records that are algorithmically generated to simulate measurements of the real-world objects.

In one scenario, developers often need a large amount of real or realistic data records to test products they develop. For example, a product under development may require a validation process that checks the existence of address data. Thus, when the existing test data set is small, for testing purposes, the developers may have to crawl the web (e.g., via Google Maps or other applications) to manually enter real life addresses into the test data set.

In another scenario, demonstration of a developed product often requires real data records. For example, an enterprise software may present its users with a table filled with various information (e.g., name, address, phone, email, website, products, etc.) of many real clients (e.g., companies). To demonstrate such a feature to a potential customer, it may be necessary to create a large client list for the potential customer by manually searching and entering relevant information to a demonstration database.

In yet another scenario, machine learning and/or artificial intelligence often require a large amount of realistic or real data records to train, tune, and/or improve the underlying algorithms. For example, a data scientist may want to test an algorithm to predict market capitalizations of companies. The data scientist may have an input schema (e.g., attributes and class labels, etc.) that is fully defined but only a limited number of data records corresponding to the input schema. Thus, to test and refine the algorithm, the data scientist may have to search the web for real-world data records and build a test dataset manually.

There are many other scenarios where realistic and/or real data records are lacking. There are multiple reasons contributing to this. For example, although a large amount of real data records are freely available on the web, it can be labor-intensive and error-prone (thus expensive) to retrieve relevant data records and then enter the data records into database tables that are organized according to a specific data schema (e.g., with predefined class labels, attributes, etc.). As another example, even if an enterprise may have access or even "own" a lot of real data records, such data records may not be broadly accessible internally due to privacy concerns or other reasons.

Accordingly, it is advantageous to implement a technology, as described herein, to automatically retrieve realistic and/or real data records matched to a desired data schema from available knowledge bases, such as knowledge graphs.

Example 2—Overview of Knowledge Graphs

Generally, a knowledge graph is a special type of database that maintains knowledge or information in a graph form. Knowledge graphs can be publicly available and free (e.g., DBpedia, Wikidata, BabelNet, DBkWik, DBnary, etc.) or privately built and proprietary.

A typical knowledge graph includes a plurality of nodes representing objects (also referred to as "entities") and a plurality of edges (also referred to as "properties") connecting the nodes. The edges represent relationship between the objects (e.g., is a parent of, is located in, etc.). One common type of knowledge graph is based on the resource description framework (RDF), which models statements of facts or web resources in expressions of the form subject-predicate-object, known as triples. For example, two nodes connected by an edge can describe a fact, which can be represented as (subject, predicate, object) triples.

As an example, FIG. 1 shows a portion of a DBpedia knowledge graph 100 containing four nodes 110 respectively represent objects of "SAP_SE," "Germany," "Company," and "Country." A string "1972-01-01" can also be deemed as a node 130. The knowledge graph 100 also includes edges or properties 120, such as "type," "foundationPlace," and "foundingYear," which represent relationships between the nodes 110. As shown, several facts can be contained in this knowledge graph, such as (SAP_SE, is a type of, Company), (SAP_SE, has foundation place, Germany), (Germany, is a, Country), and (SAP_SE, has founding year, Jan. 1, 1972).

In some knowledge graphs (e.g., RDF knowledge graphs), it is also possible to apply reasoning to the (subject, predicate, object) triples (e.g., rather than stating explicitly that "Germany" is a country as exemplified in FIG. 1). For example, according to a preconstructed reasoning rule, every object of "dbo:foundationPlace" is a country (by setting the property range). Thus, through reasoning, the triple (Germany, type, Country) can be "reasoned" or "materialized" into a statement of fact: "Germany is a country." Other reasoning rules can be similarly constructed. In addition, some reasoning rules can include restrictions to certain entities and/or edges. For example, one restriction can be that the entity "Company" must not be a person. Another restriction can be that the starting point of the edge "foundingYear" must be an organization and the target of the edge "foundingYear" must be a string; etc. The technology described herein also applies to such reasoning-based knowledge graphs.

Typically, an object represented by a node contains an identifier (ID) and a label representing name of the object. The node can also have an associated uniform resource identifier (URI) (sometimes also referred to as uniform resource locator, or URL). The relationships represented by edges can be characterized by a set of edge properties that are specific to the knowledge graph. Each edge property can also have a unique URI.

Some of the nodes may represent more specific objects and can be deemed as instances contained in the knowledge graph. For example, "SAP_SE" can be an instance representing a specific company, and "Germany" can be an instance representing a specific country. The strings (e.g., "Jan. 1, 1972") can also be deemed as instances. Some of the nodes may represent more generic objects and can be deemed as classes. For example, "Company" is a class that captures the common concept shared by many individual companies including "SAP_SE," and "Country" is a class that captures the common concept shared by many individual countries including "Germany."

For a given knowledge graph, an ontology can be created by describing the classes with a list of properties represented by the edges. In other words, the aggregation of all classes and edges in a knowledge graph can define an ontology. For example, the DBpedia ontology currently covers over 600 class objects which form a subsumption hierarchy and are described by over 2,000 different edge properties.

As described herein, the ontology of a knowledge graph can contain the schema or common vocabulary that defines edges or properties of the nodes that are available in the knowledge graph. For example, the ontology of the knowledge graph depicted in FIG. 1 defines at least the following properties of the instance "SAP_SE": "type," "foundationPlace," and "foundingYear." In addition, the ontology of the knowledge graph depicted in FIG. 1 also defines at least the following two classes: "Company" and "Country."

There can be different ways to differentiate between instances and classes. For example, a knowledge graph can have predefined property prefixes, which can indicate whether a node is an instance or a class (e.g., a node can be deemed as a class if it has a prefix "dbo," which represents DBpedia ontology, and a node can be deemed as an instance if it has a prefix "dbr," which represents DBpedia resource). In certain cases, a knowledge graph can use URI design to differentiate between instances and classes. In certain cases, a knowledge graph can include statements which explicitly indicates certain nodes are classes. In certain cases, whether a specific node represents an instance or a class can depend on the underlying model or concept. For example, in DBpedia, whether a node is a class (thus belongs to an ontology of the knowledge graph) or an instance (thus not included in the ontology of the knowledge graph) can be determined by checking the rdf: type property: If the type is owl:Class, then it is a class and belongs to the ontology; otherwise it is deemed as an instance and not belongs to the ontology.

Compared to relational databases, the knowledge graph has a more flexible data structure because the types of data provided by the knowledge graph can vary. For example, properties associated with different instances can differ even though these instances share the same class (e.g., "SAP_SE" and "BASF_SE" can have different property data available although they share the same class "Company"). On the other hand, a relational database can be represented in a knowledge graph format, i.e., the knowledge graph can be a higher-level abstraction of the relational database.

In certain examples, the nodes in a knowledge graph can be organized in a hierarchical structure where a lower-level node (representing a more specific object) may be connected to a higher-level node (representing a more generic object) by one or more edges. The lower-level node (or the lower-level object it represents) can be called a descendant of the higher-level node (or the higher-level object it represents), and the higher-level node (or the higher-level object it represents) can be called an ancestor of the lower-level node (or the lower-level object it represents).

Since knowledge graphs contain many real-world entities/objects/instances and their corresponding properties, they can be valuable data sources where realistic or real data records can be retrieved. The technology described herein can support schema-based automatic data retrieval from knowledge graphs. For example, FIG. 1 shows that a schema-based knowledge graph data retrieval system 150, which is described more fully below, can retrieve data records corresponding to a specific data schema from the knowledge graph 100. In other words, the technology described herein can automatically retrieve realistic or real data records from the knowledge graphs and match the retrieved data to a desired schema. Such schema-based automatic data retrieval technologies can be applied across a wide variety of enterprise software environments.

Figure 2:
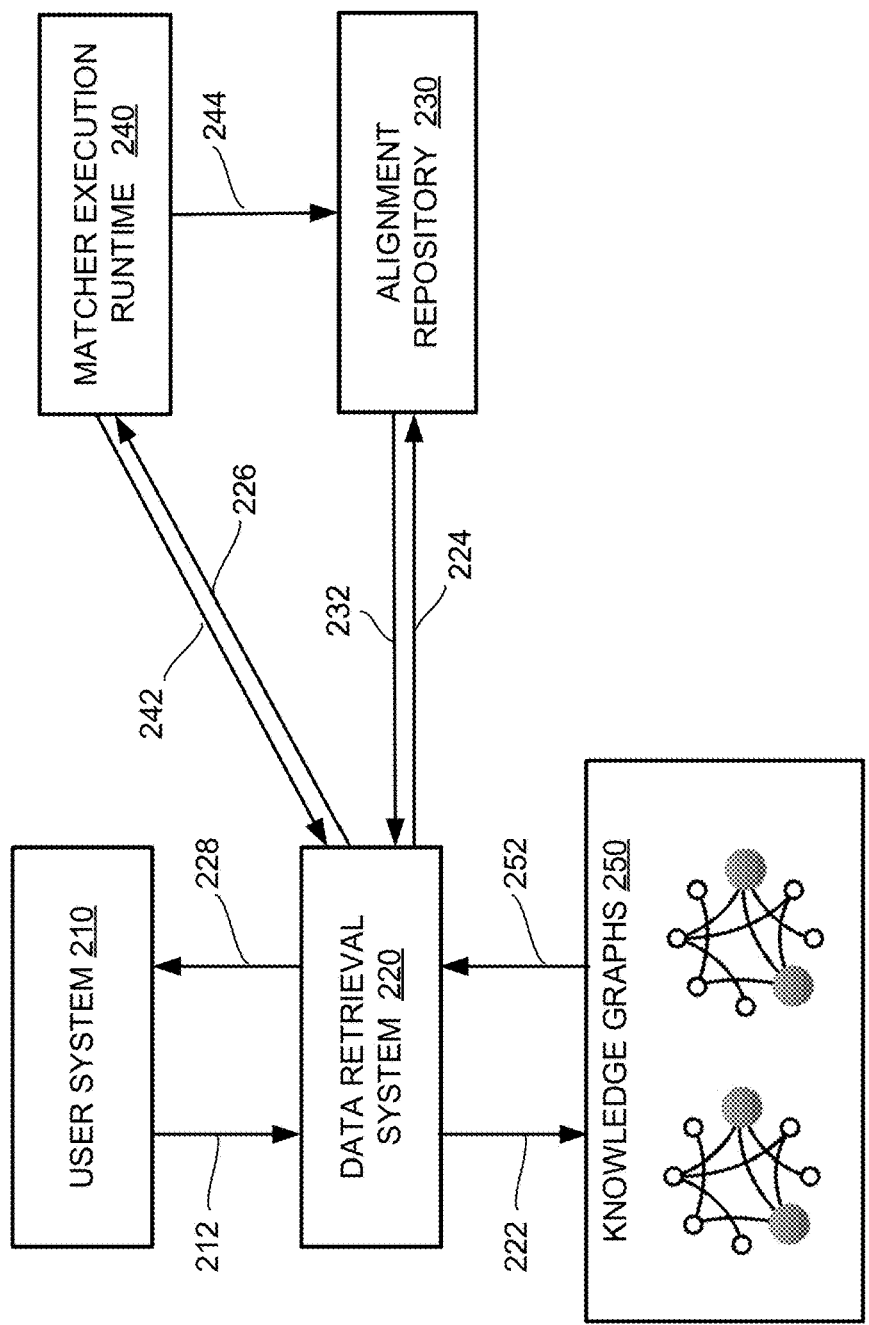
FIG. 2 is an overall block diagram of an example computing system configured to implement schema-based data retrieval from knowledge graphs.

Example 3—Example Overview of a Computing
System Configured to Implement Schema-Based
Data Retrieval from Knowledge Graphs FIG. 2 shows an overall block diagram of an example computing system 200 supporting schema-based data retrieval from knowledge graphs. Thus, the computing system 200 (which represents an example embodiment of 150) can also be referred to as a schema-based knowledge graph data retrieval system.

As shown, the computing system 200 includes a user system 210, a data retrieval system 220, an alignment repository 230, and a matcher execution runtime 240 (also referred to as "schema matcher"). In certain examples, the computing system 200 also includes one or more knowledge graphs 250. In certain examples, the knowledge graphs 250 can be external to the computing system 200. As described herein, the knowledge graphs 250 can include public knowledge graphs that are freely accessible from the Web and/or proprietary knowledge graphs owned by private entities.

In certain cases, some components of the computing system 200 can be integrated. As an example, the user system 210, the data retrieval system 220, the alignment repository 230, and the matcher execution runtime 240 can be integrated in one host machine. As another example, the user system 210 can be located in one host machine, whereas the data retrieval system 220, the alignment repository 230, and the matcher execution runtime 240 can be integrated in another host machine.

In certain cases, components of the computing system 200 can be independent of each other and deployed in a distributed network as separate services. For example, the user system 210, the data retrieval system 220, the alignment repository 230, and the matcher execution runtime 240 can be respectively deployed in separate host machines that are distributed across multiple sites and communicate with each other via a computer network.

In FIG. 2, interactions between components of the computing system 200 are represented by arrows, and such interactions can follow a sequential order. For example, the arrow 212 represents that a user on the user system 210 can send a request (also referred to as "user request") to the data retrieval system 220, requesting data for a specific data schema.

After receiving the request, the data retrieval system 220 can check or search the alignment repository 230, as indicated by the arrow 224, to determine whether a schema alignment corresponding to the data schema is available in the alignment repository 230. As described further below, a schema alignment corresponding to the data schema refers to an alignment that matches the data schema to a subset of an ontology of at least one knowledge graph 250.

The arrow 232 indicates that the alignment repository 230 can return an empty or a filled schema alignment to the data retrieval system 220. For example, if a schema alignment corresponding to the data schema is available in the alignment repository 230, such schema alignment will be returned. Otherwise, an empty alignment is returned.

If an empty alignment is returned, as indicated by the arrow 226, the data retrieval system 220 can send a request to the matcher execution runtime 240, requesting the matcher execution runtime 240 to perform a specified schema matching operation.

After receiving such a request, the matcher execution runtime 240 can perform the schema matching operation to obtain a schema alignment which maps the data schema to a subset of an ontology of a knowledge graph. As indicated by the arrow 244, the matcher execution runtime 240 can write the result (i.e., the obtained schema alignment) to the alignment repository 230. As a result, future requests of data for the same data schema can find the corresponding schema alignment in the alignment repository 230. In other words, it can avoid the need of requesting the matching execution runtime 240 to run the schema matching operation again, thus improving the operation efficiency.

In addition to writing the result to the alignment repository 230, the matcher execution runtime 240 can also return the obtained schema alignment to the data retrieval system 220, as indicated by the arrow 242.

Based on the schema alignment, which can be received from the alignment repository 230 or the matcher execution runtime 240, the data retrieval system 220 can generate one or more queries. As indicated by the arrow 222, the data retrieval system 220 can run those queries on one or more pre-specified knowledge graphs 250.

As indicated by the arrow 252, the data retrieval system 220 can receive the query results. The query results can be saved, at least temporarily, in a storage media (e.g., memory, disk, etc.). In certain cases, the data retrieval system 220 can process the query results (e.g., composing and/or ranking) to generate a list of data records corresponding to the data schema.

Then, as indicated by the arrow 228, the list of data records can be returned to the user system 200. The user system 200 can then persist the list of data records to the data schema. In certain cases, the data retrieval system 220 can directly persist the list of data records to the data schema.

Depending on the application areas of the disclosed technology, multiple downstream scenarios of using the retrieved data records are possible. For example, the retrieved data records can be displayed for manual review, automatically inserted into database tables (e.g., for testing and/or demonstration purposes), stored in a local cache for further refinement, and/or exported/downloaded in a specific format (e.g., CSV, etc.) for other applications (e.g., for data science applications), etc.

In practice, the systems shown herein, such as system 200, can vary in complexity, with additional functionality, more complex components, and the like. For example, there can be additional functionality within the data retrieval system 220. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The system 200 and any of the other systems described herein can be implemented in conjunction with any of the hardware components described herein, such as the computing systems described below (e.g., processing units, memory, and the like). In any of the examples herein, the data schema, the schema alignment, the attributes, the queries, the query results, the data records, and the like can be stored in one or more computer-readable storage media or computer-readable storage devices. The technologies described herein can be generic to the specifics of operating systems or hardware and can be applied in any variety of environments to take advantage of the described features.

Example 4—Example Cloud-Based Data Retrieval
Services

In certain examples, the schema-based knowledge graph data retrieval system described above can be implemented in a customer computer, for example, as a stand-alone on-premises software installed on a company's local computers or servers. In other examples, a part of or the complete schema-based knowledge graph data retrieval system can be implemented in a cloud which is hosted on a vendor's servers and can be accessed through a web browser.

Figure 3:
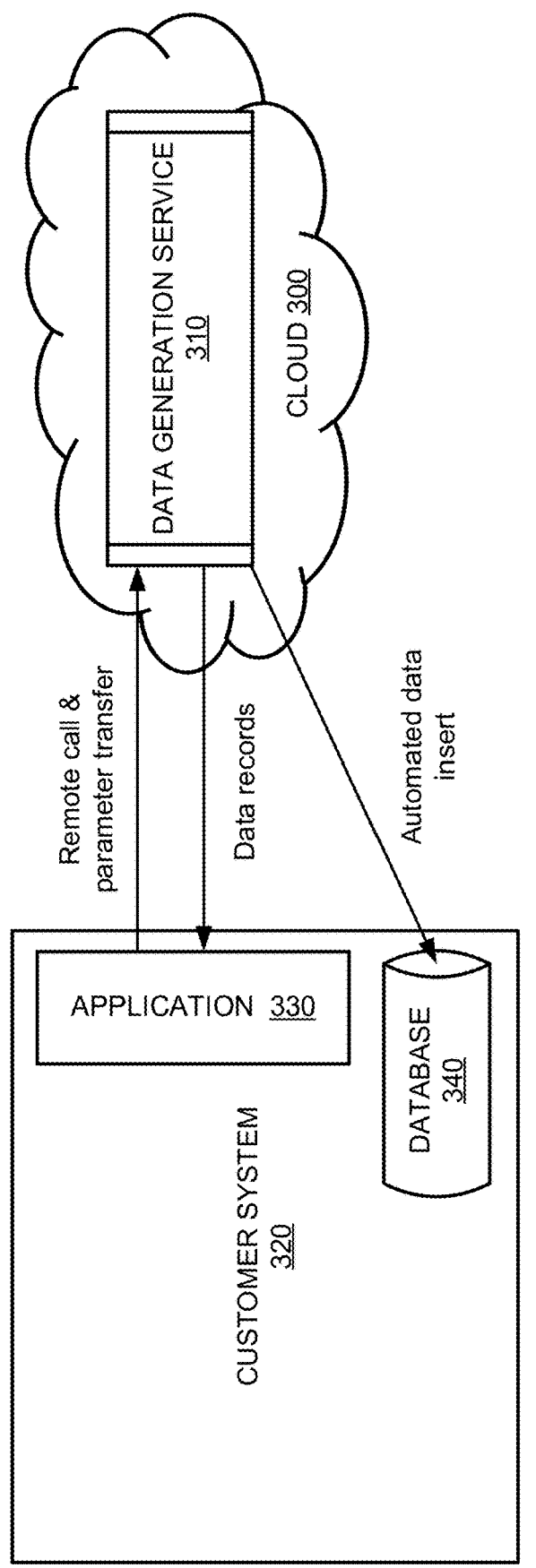
FIG. 3 is a block diagram illustrating an example cloud-based schema-based data generation service in communication with a software application running on a customer system.

For example, FIG. 3 shows a data generation service 310 located on a cloud 300. The data generation service 310 can include the data retrieval system 220. The data generation service 310 can also include the alignment repository 230 and/or the matcher execution runtime 240. Alternatively, the alignment repository 230 and/or the matcher execution runtime 240 can be external to the data generation service 310 (e.g., such components can be located in another cloud and communicate with the data generation service 310). The data generation service 310 can access one or more knowledge graphs (e.g., 250), which can reside in the cloud 300 or elsewhere.

A customer system 320 (similar to the user system 210) can run a software application 330, which includes an application programming interface (API) that can communicate with the cloud-based data generation service 310. Specifically, the application 330 can make remote calls and transfer parameters including a desired data schema to the data generation service 310. Responsive to the remote calls, the data generation service 310 can retrieve relevant data from the knowledge graphs and generate a list of data records corresponding to the desired data schema. The generated list of data records can be returned from the data generation service 310 to the application 330. In certain examples, when the application 330 requests data records for a database 340 having a specific data schema, the data generation service 310 can automatically insert the generated data records to the database 340.

In certain examples, the application 330 can also run as a service on the cloud 300 and a customer can subscribe to such a service. In such circumstances, all components of the schema-based knowledge graph data retrieval system can be implemented on the cloud.

Example 5—Example Data Retrieval System

Figure 4:
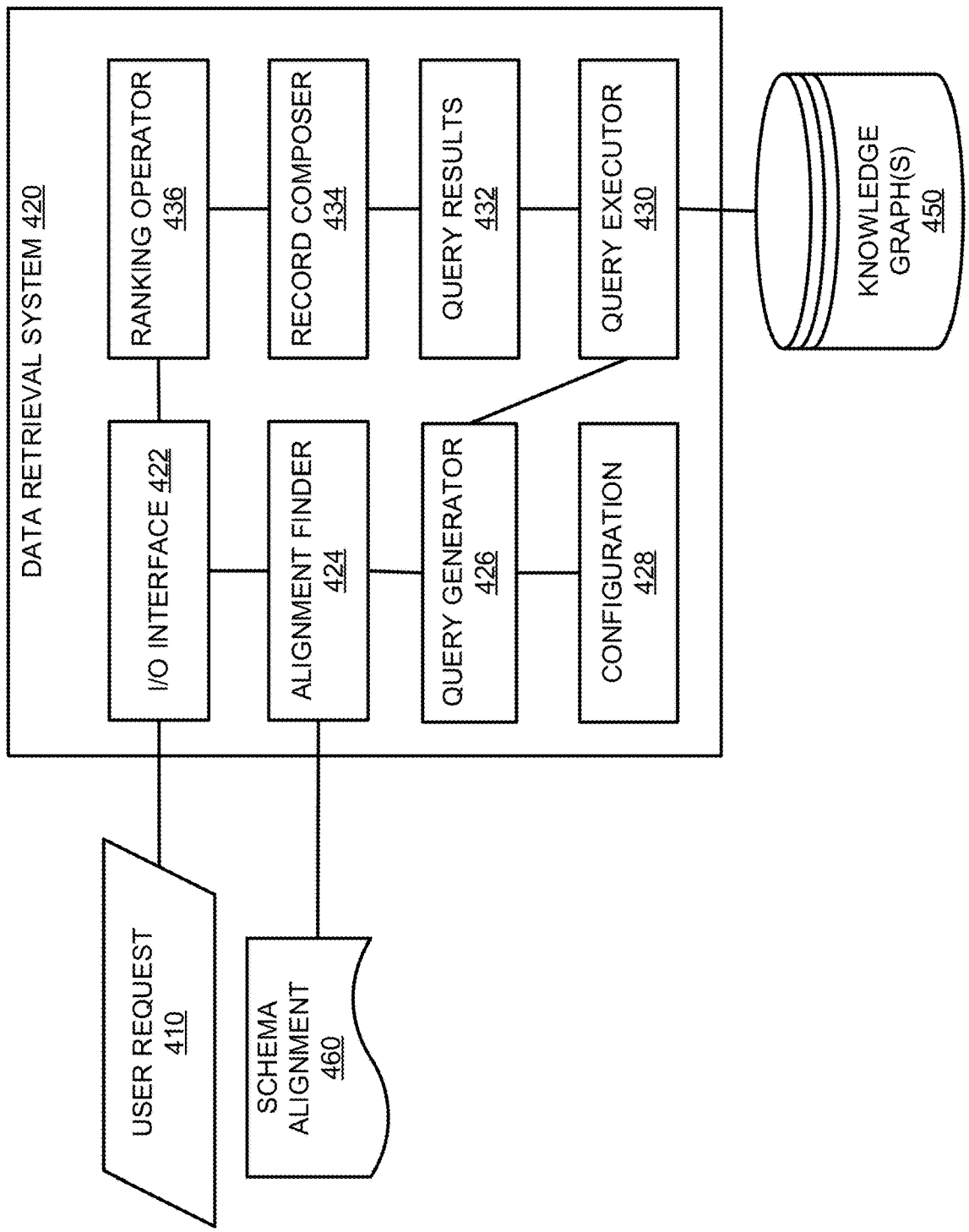
FIG. 4 is a block diagram illustrating components of an example data retrieval system.

FIG. 4 is a block diagram illustrating components of an example data retrieval system 420, which can be an example embodiment of 220. In the depicted example, the data retrieval system 420 includes an input/output (I/O) interface 422, an alignment finder 424, a query generator 426, a configuration file 428, a query executor 430, a storage place (e.g., cache memory) for query results 432, a record composer 434, and a ranking operator 436. Some of these components can be integrated. For example, in certain cases, the record composer 434 and a ranking operator 436 can be combined into one unit. In certain examples, additional components can be included in the data retrieval system 420.

The I/O interface 422 can be configured to receive a user request 410. The user request 410 can request data records according to a specific data schema. The user request 410 can also specify how many data records are desired for the data schema. In some examples, the user request 410 can include additional parameters that affect the data retrieval process. In certain examples, some of the additional parameters can override one or more default parameters stored in the configuration file 428.

After receiving the user request 410 of data records for the data schema, the I/O interface 422 can active the alignment finder 424, which is configured to obtain a schema alignment 460 which maps the data schema to a subset of an ontology of a knowledge graph 450. The subset can include classes and/or properties defined in the ontology of the knowledge graph 450. In certain cases, multiple schema alignments 460 can be obtained and these schema alignments 460 can map the data schema to respective ontology of multiple knowledge graphs 450.

As described above, in certain examples, the alignment finder 424 can check an alignment repository (e.g., 230) and retrieve the schema alignment(s) 460 from the alignment repository if the schema alignment(s) 460 are found in alignment repository. In certain examples, the alignment finder 424 can request a schema matcher (e.g., 240) to generate the schema alignment(s) 460 at the runtime based on the data schema and the ontology of the knowledge graph. This can occur if the schema alignment(s) 460 are not found in the alignment repository, or the user request 410 has a parameter specifying not to check the alignment repository (i.e., always generating the schema alignment(s) 460 by the schema matcher at the runtime).

Based on the schema alignment(s) 460, the query generator 426 can generate one or more queries (e.g., SPARQL queries), as described more fully below. The method of generating the queries can be controlled by some default parameters stored in the configuration file 428. In some examples, additional parameters specified in the user request 410 can override the parameters stored in the configuration file 428, thus affecting how the queries are generated.

The query executor 430 can execute the generated queries on the knowledge graph(s) 450. The query results 432 returned after executing the queries can be processed to generate a list of data records corresponding to the data schema. The list of data records can be generated based on querying one knowledge graph or multiple knowledge graphs.

For example, in certain cases, the record composer 434 can be configured to compose the list of data records by combining the query results returned after executing different queries. As another example, when the number of generated data records is smaller than the desired number of data records specified in the user request 410, the record composer 434 can be configured to duplicate one or more of the data records. Whether duplicating data records is allowed or not can be controlled by a parameter specified in the configuration file 428 and/or the user request 410. Other approaches for increasing the number of generated data records (e.g., relaxing the query by using subtypes of classes or properties defined in the ontology) can also be implemented by the record composer 434.

The generated list of data records can be returned to the user and persisted to the data schema via the I/O interface 422. Optionally, the generated data records can be ranked by the ranking operator 436. Whether ranking should be performed or not can be controlled by a parameter specified in the configuration file 428 and/or the user request 410. In some cases, when the generated data records are more than the desired number of data records specified in the user request 410, only the desired number of data records ranked high on the list can be returned and persisted to the data schema. The ranked data records can also be used for evaluating the performance of the data generation service or other purposes.

Figure 5:
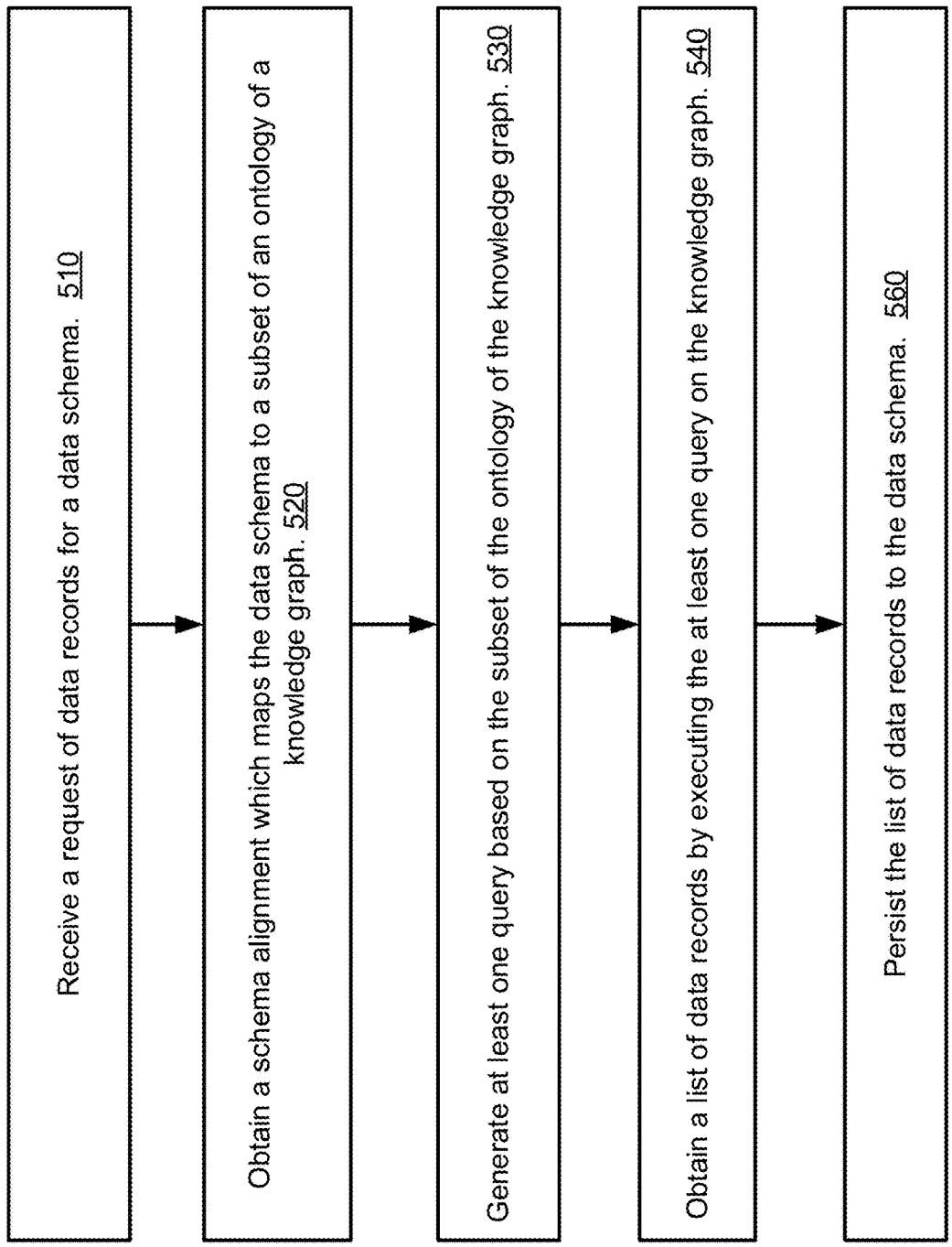
FIG. 5 is a flowchart illustrating an example overall method of implementing schema-based data retrieval from knowledge graphs.

Example 6—Example Overall Method of Implementing Schema-Based Data Retrieval from Knowledge Graphs FIG. 5 is a flowchart of an example overall method 500 of implementing schema-based data retrieval from knowledge graphs and can be performed, for example, by the system of FIG. 1.

At 510, the method 500 can receive a request (e.g., 410) of data records for a data schema. The request can specify the data schema (e.g., structures and attributes), as well as the desired number of data records. The request can also include additional parameters that affect the data retrieval process.

At 520, the method 500 can obtain a schema alignment (e.g., via the alignment finder 424) which maps the data schema to a subset of an ontology of a knowledge graph. As described above, the schema alignment(s) can be retrieved from an alignment repository (e.g., 230) or generated at the runtime by a schema matcher (e.g., 240).

At 530, the method 500 can generate at least one query (e.g., via the query generator 426) using the subset of the ontology of the knowledge graph. As described more fully below, generating the at least one query can include constructing a basic graph pattern. The basic graph pattern can include a triple pattern including a class or property defined in the subset of the ontology of the knowledge graph, wherein the schema alignment can map an attribute of the data schema to the class or property. In certain examples, the basic graph pattern can include a plurality of triple patterns including respective classes or properties defined in the subset of the ontology of the knowledge graph, wherein the schema alignment can map a plurality of attributes of the data schema to the respective classes or properties.

At 540, the method 500 can execute the at least one query (e.g., via the query executor 430) on the knowledge graph to obtain a list of data records. In certain examples, the method 500 can compose the list of data records (e.g., via the record composer 434) by combining query results returned after executing a plurality of queries. The plurality of queries can be configured to return respective query results corresponding to different attributes of the data schema, wherein the schema alignment can map different attributes of the data schema to respective classes or properties defined in the subset of the ontology of the knowledge graph.

At 540, the method 500 can persist the list of data records to the data schema. In certain examples, the method 500 can duplicate one or more data records (e.g., via the record composer 434) before persisting the list of data records to the data schema. In certain examples, the method 500 can rank the list of data records (e.g., via the ranking operator 436) before persisting the list of data records to the data schema.

The method 500 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "receive" can also be described as "send" from a different perspective.

Example 7—Example User Request and Configurable Parameters

In any of the examples herein, the user request (e.g., 410) can specify a desired number of data records to be retrieved and a data schema corresponding to which the data records are organized. Generally, a data schema describes the data structure in which data is held. The data schema can be of different types. For example, the data schema can define the data structure in a relational database, a conceptual data model, an application interface, or others.

In certain examples, the user request can take the form of a method call. One example method call (in Java notation) can be represented as:

List<Records>getData(Schema S, int recordNumber)

Here, the input parameters of the method call getData includes the data schema (5) and the desired number of data records (recordNumber), and the output of the method call includes a list of data records (or instances) that fulfill the provided data schema (5).

In any of the examples herein, elements of a data schema can include structures (e.g., entities, tables, objects, etc.) and attributes. In certain examples, a structure in the data schema can include attributes (e.g., columns in a database table, etc.). Attributes in a structure can carry respective values (e.g., column values in a database table, etc.). In certain examples, a structure in the data schema can include substructures so as to form a nested structure.

Figure 6:
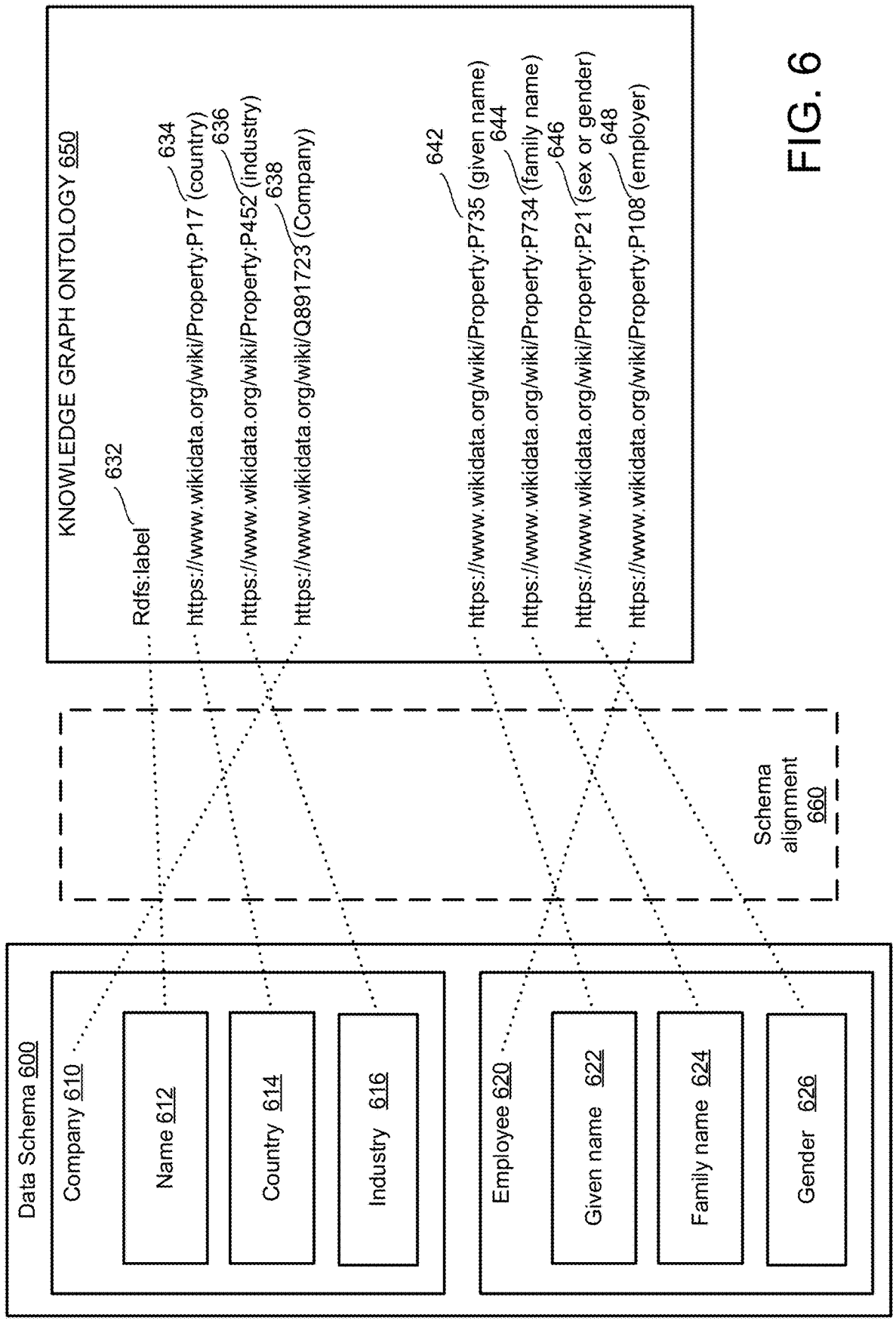
FIG. 6 is a diagram illustrating an example schema alignment that matches a data schema to a subset of an ontology of a knowledge graph.

As an example, FIG. 6 shows a data schema 600 containing at least two structures: the structure "company" 610 and the structure "Employee" 620. The structure "company" 610 includes at least the following attributes: "Name" 612 (i.e., the name of a company), "Country" 614 (i.e., the country where the company is located), and "Industry" 616 (i.e., the industry to which the company belongs). In addition, the structure "Employee" 620 includes at least the following attributes: "Given name" 622 (i.e., the given name of an employee), "Family name" 624 (i.e., the family name of the employee), and "Gender" 626 (i.e., the gender of the employee).

As described above, the data retrieval system (e.g., 420) can have a configuration file (e.g., 428) containing default parameters that control the query-based data retrieval process.

As an example, the configuration file can include a lookup list for knowledge graphs. In certain cases, the lookup list can take the form of: Map<K, Access Data>, where K represents one or more knowledge graphs, and Access Data represents information that is required to access the knowledge graphs. For example, in the case of public knowledge graphs, the Access Data can be as simple as the SPARQL endpoint URL, whereas in the case of internal (e.g., enterprise) knowledge graphs or commercial knowledge graphs, the Access Data can include user credentials that are required to gain access to the knowledge graphs.

As another example, the configuration file can specify an alignment repository (e.g., AR) where all alignments are stored. The data retrieval system can then check the alignment repository and retrieve a schema alignment corresponding to the specified data schema if such schema alignment is found in the alignment repository.

As yet another example, the configuration file can include a list of matching operation implementations, e.g., List<Match System>, where the List contains different schema matching algorithms that can be performed by a designated schema matcher (e.g., 240). As described herein, the schema matcher is a runtime that can execute any one of the schema matching algorithms included in the List to obtain a schema alignment. In certain cases, the schema matcher can be a server providing the execution capabilities such as the Ontology Matching EvaLuation Toolkit (MELT), which is an open-source toolkit (see, e.g., https://github.com/dwslab/melt) for ontology matcher development, fine-tuning, submission, and evaluation.

As a further example, the configuration file can include a parameter specifying a default language, which can limit the data retrieval process to return only data records that are compatible or consistent with the specified language.

Optionally, the user request (e.g., the method call getData) can include additional parameters to customize the data retrieval service request. Such additional input parameters can change one or more default parameters defined in the configuration file.

For example, certain input parameters can include a set of schema alignment, e.g., Set<A>, indicating that the data retrieval service shall not use the alignment repository (or the schema matcher) to obtain a schema alignment.

As another example, certain input parameters can specify one or more ranking criteria for ranking the returned data records.

As yet another example, certain input parameters can include a set of schema elements, e.g., Set<SchemaElements>, which indicate whether the corresponding element of the data schema (e.g., structure or attribute) is value-independent or value-dependent, as described further below.

As a further example, certain input parameters can include a Boolean value (e.g., allowForDuplicates) which indicates whether duplicate data records are allowed.

Example 8—Example Schema Alignment

In any of the examples herein, a schema matching operation performed by a schema matcher (e.g., 240) can align a data schema with an ontology of a knowledge graph. More specifically, the schema matcher can map the data schema to a subset of the ontology of the knowledge graph.

Denote $P_K$ a set of properties in the knowledge graph (K) and $C_K$ a set of classes in K. Further denote match (S, K) the operator that aligns the data schema (S) with the ontology of K, i.e., $P_K$ and $C_K$. The result of the schema matching operation (e.g., match (S, K)) is a schema alignment, denoted as A. In any of the examples described herein, a schema alignment includes a set of correspondences, where a correspondence can be defined as a triple: $<n_S, n_k, R>$, where $n_S$ refers to an element in the data schema S and $n_k$ refers to a class or property defined in the ontology of K, and R is the relation that holds between the two elements $n_S$ and $n_k$. In most cases, R can be equivalence (≡).

It is to be understood that the schema-based data retrieval technology described herein is not limited to any specific schema matching operation. Any automatic and/or semi-automatic schema matching algorithms can be employed to map the data schema (S) to a subset of the ontology of the knowledge graph (K). In certain cases, match (S, K) can be manually carried out by humans. The result of the schema matching operation, i.e., the schema alignment (A) can then be used to create a query as described further below.

To illustrate, FIG. 6 shows an example schema matching result, i.e., the schema alignment 660, which aligns the data schema 600 with an ontology 650 of the Wikidata knowledge graph. As shown, elements in the data schema 600, including structures and attributes, are mapped to respective classes or properties defined in the ontology 650.

Specifically, in the depicted example, the structure "company" 610 is mapped to a company class 638 represented by a specific URI as shown. The attributes "Name" 612, "Country" 614, and "Industry" 616, are respectively mapped to a label 632, a country property 634, and an industry property 636 defined in the ontology 650. Similarly, the structure "Employee" 620 is mapped to an employer property 648, and the attributes "Given name" 622, "Family name" 624, and "Gender" 626 are respectively mapped to properties 642, 644, and 646 defined in the ontology 650 represented by specific URIs as indicated. The collection of all correspondences between the matched pairs (as indicated by the dashed dotted lines) constitutes the schema alignment 660 in this example.

In certain cases, a schema alignment containing only equivalences can be used to obtain further correspondences via reasoning. For example, assume in a knowledge graph it is stated that "Bank" is equivalent to "Financial Institution," and it is further annotated that a "Bank" is a (i.e., its superclass is:) "Company." If a schema alignment maps a structure "Bank" contained in a data schema to an object "Bank" defined in the knowledge graph, then the following correspondences can be derived via reasoning: (a) the data schema's "Bank" is also mapped to the "Financial Institution" of the knowledge graph, and (b) the data schema's "Bank" is a subclass of "Company" defined in the knowledge graph.

Example 9—Example Value-Dependent and Value-Independent Attributes

As described above, the schema alignment, whether it is retrieved from an alignment repository, or generated in runtime by a schema matcher, can be used to generate queries which can be executed on the knowledge graphs to obtain data records corresponding to the data schema.

In certain examples, depending on whether attributes in the data schema are value-independent or value-dependent, the generated queries can be respectively called value-independent queries or value-dependent queries. As described more fully below, the value-independent queries can be used to retrieval realistic data records from the knowledge graphs, and the value-dependent queries can be used to retrieve real data records from the knowledge graphs.

As described herein, a value-dependent attribute refers to an attribute in the data schema which must be combined with one or more other attributes to form a valid data record. In other words, a valid data record requires a combination of values corresponding to multiple attributes, wherein the validity of the values are dependent from each other. If one of such attributes has a value that is invalid in view of (or incompatible with) other attribute values, the resulting data record is deemed invalid. For example, assume a data schema has two value-dependent attributes "Company" and "Country" respectively containing company names and countries where the headquarters of those companies are located. Thus, a data record containing values "SAP" and "Germany" is deemed valid because SAP is a valid company and Germany is a valid country where SAP is headquartered. In contrast, a data record containing values "SAP" and "Canada" is deemed invalid because SAP is not headquartered in Canada. As described further below, a value-dependent query (see, e.g., FIG. 9) can be generated based on multiple value-dependent attributes.

As described herein, a value-independent attribute refers to an attribute in the data schema which does not need to be combined with other attributes to form a valid data record. In other words, a valid data record can contain a combination of values corresponding to multiple attributes, wherein the validity of the values are independent from each other. If one of such attributes has a value that is invalid in view of (or incompatible with) other attribute values, the resulting data record can still be deemed valid. For example, assume a data schema has two value-independent attributes "Company" and "Country" respectively containing company names and countries where the headquarters of those companies are located. In this case, a data record containing values "SAP and "Canada" is deemed valid because SAP is a valid company and Canada is a valid country, i.e., the validity of the data record is not undercut by the fact that SAP is not headquartered in Canada because the attributes "Company" and "Country" are value-independent from each other. As described further below, for each value-independent attribute, a value-independent query (see, e.g., FIG. 8) can be generated.

As described above, the user request can include parameters that indicate corresponding element of a data schema (e.g., structure or attribute) is value-independent or value-dependent. If a structure is value-independent, then all attributes contained in the structure can also be deemed value-independent. As an example, FIG. 7 depicts a pseudo-code implementation of a method that determines value-independent attributes in a data schema. In this example, the method call getIndependentAttributes 700 is configured to obtain all value-independent attributes contained in a structure that is determined to be value-independent, and the method call getAllAttributes 710 is configured to recursively determine all value-independent attributes contained in the data schema by going through all substructures and attributes.

Example 10—Example Queries Generated Using Schema Alignment

In any of the examples herein, queries can be automatically generated (e.g., by the query generator 426) to retrieve corresponding data records from a knowledge graph. Generation of the queries can use the schema alignment which maps attributes of the data schema to corresponding classes or properties defined in the ontology that are represented by respective URIs.

For each attribute in the data schema, a corresponding URI mapped by the schema alignment can be derived. For example, as shown in FIG. 6, the attributes "Given name" 622, "Family name" 624, and "Gender" 626 can be respectively mapped to properties 642, 644, 646 represented by the following three URIs in the Wikidata knowledge graph:
  https://www.wikidata.org/wiki/Property:P735
  https://www.wikidata.org/wiki/Property:P734
  https://www.wikidata.org/wiki/Property:P21

In certain examples, a single query can be generated for each value-independent attribute. As an example, FIG. 8 shows one value-independent SPARQL query 800 that is automatically generated based on the value-independent attribute "Family name" 624, which is mapped to the property 642 (URI https://www.wikidata.org/wiki/Property:P734) defined in the ontology of the Wikidata knowledge graph.

Generally, a SPARQL query can include a set of triple patterns called a basic graph pattern. Triple patterns are like RDF subject-predicate-object triples except that each of the subject, predicate and object can be a variable. A basic graph pattern matches a subgraph of the RDF data when RDF terms from that subgraph may be substituted for the variables and the result is an RDF graph that is equivalent to the subgraph.

As shown in FIG. 8, the SPARQL query 800 includes a basic graph pattern 802, which includes a triple pattern 804 in which the predicate is wdt:P734, referring to the property 642 defined in the ontology of the Wikidata knowledge graph. When executed on the Wikidata knowledge graph, if no restriction is applied, the query 800 will return query results which include the labels of all nodes contained in Wikidata that have the property 644 (i.e., family names).

In certain examples, the query 800 can include a filter 806 which restricts the query results, e.g., the query results are limited to English language in this example. As noted above, the default language used for the queries can be specified in a configuration file, and may be modified by a parameter contained in the user request. In certain examples, the query 800 can specify an upper limit 808 (e.g., 10 in the depicted example) that limits the number of returned results to improve the performance of the data retrieval (e.g., reduce the query search runtime).

In certain examples, a single query can be generated that corresponds to multiple value-dependent attributes. As an example, FIG. 9 shows one value-dependent SPARQL query 910 that is automatically generated based on three value-dependent structure or attributes "Company" 610, "Country" 614, and "Industry" 616, which are respectively mapped to the class 638 or properties 634 and 636 represented by the following URIs in the Wikidata knowledge graph (see, e.g., FIG. 6):
  htttps://www.wikidata.org/wiki/Q891723
  htttps://www.wikidata.org/wiki/Property:P17
  htttps://www.wikidata.org/wiki/Property:P452

As shown in FIG. 9, the SPARQL query 910 includes a basic graph pattern 912, which includes a triple pattern 914 in which the object is Q891723 referring to the class 638 (note: the predicate wdt:P31 is "instance of"), a triple pattern 916 in which the predicate is wdt:P17 referring to the property 634, and a triple pattern 918 in which the predicate is wdt:P452 referring to the property 636. These triple patterns are combined or work in conjunction when executing the query 910. Thus, when executed on the Wikidata knowledge graph, if no restriction is applied, the query 910 will return query results which include the labels of all nodes contained in Wikidata which respectively represent the company name, the country where the company is located, and the industry to which the company belongs. Similarly, in certain examples, the query 910 can also include filters which restrict the query results (e.g., limiting the query results to English language) and/or specify an upper limit that limits the number of returned query results.

As an example, FIG. 10 shows a list of query results obtained after executing the value-dependent query 910 on the Wikidata knowledge graph. As shown, the query results can be organized into a data table 1000, which corresponds to a data schema comprising attributes of the three depicted columns (i.e., Name, Country, Industry). Thus, each row in the table 1000 can constitute a data record matched to the data schema. Because the query 910 is value-dependent, the data records contained in the table 1000 can be considered real. For example, the first row of table 1000 represents a real data record because the values of all attributes are valid and consistent with each other: Honda is a company headquartered in Japan and it belongs to the automotive industry.

In certain cases, the data records returned after executing a value-dependent query may contain NULL values, indicating empty query result for certain attributes. In other words, the query may return valid values corresponding to some, but not all, attributes. For example, a record in the table 1000 may include valid values for the attributes "Name" and "Country," but a NULL value for the attribute "Industry." This can happen when the knowledge graph does not contain relevant data (e.g., the knowledge graph may contain the name and country information of a company, but contain no information on the industry of the company). In SPARQL queries, NULL values can occur when SPARQL OPTIONAL is used. In certain examples, whether or not NULL values are allowed can be determined based on the settings in the configuration file and/or parameters specified in the user request.

Example 11—Example Methods of Broadening Queries

As noted above, the user request can specify a desired number of data records for a data schema. If the number of data records retrieved from the knowledge graphs after executing the queries is smaller than the desired number of data records, one or more additional steps can be taken to generate more data records for the data schema.

In certain examples, when an original query does not return enough data records, the original query can be automatically reformulated to generate one or more new queries, which are configured to broaden the search of the knowledge graph (i.e., query expansion) and return more data records. Reformulation of the query can be based on reasoning rules contained in the knowledge graph. As described above, certain knowledge graphs can have preconstructed reasoning rules, which can be exploited to broaden the query in a logical way.

For example, assuming the original query is configured to search the knowledge graph for all instances associated with a class or property "car brand" defined in the ontology of the knowledge graph. Further assuming that the ontology of the knowledge graph has a preconstructed reasoning rule which states that "sport car brand is a car brand." In other words, the rule indicates that "sport car brand" is a subtype of the "car brand." Thus, if the original query does not return sufficient search results, the original query can be reformulated to a new query which is configured to search the knowledge graph for all instances associated with the "sport car brand." If the "car brand" has other subtypes (e.g., "foreign car brand," "luxury car brand," etc.) defined in the ontology, these subtypes can also be used to automatically generate new queries to obtain additional search results. In other words, the schema alignment can be dynamically modified by mapping attributes of the data schema to a different subset of the ontology (i.e., changed from "car brand" to "sport car brand" or other subtypes).

Example 12—Example Methods of Composing Data Records

In certain examples, when a value-dependent query does not return enough data records, at least some of the returned data records can be duplicated if record duplication is allowed (e.g., based on the settings in the configuration file and/or parameters specified in the user request). As an example, FIG. 11 depicts a pseudo-code implementation 1100 of a method of generating duplicates of data records obtained after executing a value-dependent query. In certain examples, the returned data records can be randomly selected and copied until the total number of data records equals to the desired number of data records.

In any of the examples described herein, the disclosed technology can compost the list of data records by combining query results returned after executing a plurality of queries. For example, when a plurality of value-independent queries are configured to return respective query results corresponding to different attributes of the data schema, the returned query results can be randomly combined in order to generate the desired number of data records. If all combinations are still not enough to obtain the desired number of data records, duplicate records (if allowed) can be generated as described above.

As an example, FIG. 12 depicts a table 1100 containing a list of composed data records (in rows) obtained after executing value-independent queries on a knowledge graph. In this example, instead of executing a value-dependent query to obtain complete data records containing all three attributes (i.e., "Given name," "Family name," and "Gender") according to a data schema, three value-independent queries are executed independently to obtain three separate sets of query results respectively corresponding to the three attributes. For example, one value-independent query for the attribute "Given name" can return query results including "Sabine," "Klein," and "Jan Philipp." A second value-independent query for the attribute "Family name" can return query results including "Bendieck," "Christian," and "Portisch." A third value-independent query for the attribute "Gender" can return query results including "Male" and "Female." Then, the returned query results can be randomly combined to generate data records corresponding to the data schema. Such generated data records may be realistic but not real. For example, the fourth row in the table 1100 represents a composed data record where the given name is "Jan Philipp," the family name is "Klein" (which is also a given name returned after executing the first query), and the gender is "Female" despite the fact that "Jan Philipp" typically indicates a male's name in German.

Example 13—Example Methods of Ranking Data Records

In certain cases, especially when the returned data records are too many, a user may want to have a ranked list of data records so that the user can quickly review those data records that are ranked high on the list to check if they are satisfactory before persisting the data records to the data schema. There can be other rationales that data records that follow certain sorted order are desired, and various sorting/ranking criteria can be used depending on particular applications. The sorting/ranking criteria and relevant parameters can be specified in the configuration file and/or the user request.

In certain examples, the returned data records can be ranked based on completeness of the data records and/or duplicate status of the data records. As described above, a returned data record (e.g., after executing a value-dependent query) may contain NULL values. Thus, a record completeness index $c \in [0, 1]$ can be calculated as the share of attributes (within a generated record) that are not NULL. For duplicate records, the record completeness index c can be set to zero.

As an example, FIG. 13 shows a table 1300 containing three data record (i.e., 1310, 1320, and 1330) returned after executing a query on a knowledge graph. In this example, similar to the data table 1000, the returned data records correspond to a data schema having three attributes related to a company: "Name," "Country," and "Industry." The data record 1310 contains valid values for all three attributes, thus its record completeness index c is calculated as 1. The data record 1320 contains valid values for attributes "Name" and "Country," but has a NULL value for the attribute "Industry." Thus, its record completeness index c is calculated as $2/3$. Although the data record 1330 contain valid values for all three attributes, it is considered as a duplicate of the data record 1310. Thus, its record completeness index c is set to 0. As a result, the returned data records can be ranked in the following descending order: 1310>1320>1330.

Although a specific ranking method is described above, it is to be understood that other ranking methods can be used based on specific applications and/or other considerations, e.g., the alphabetic orders of certain attributes, the quality or trustworthiness of the knowledge graphs, etc.

Example 14—Example Advantages

A number of advantages can be achieved via the technologies described herein. For example, a developer can easily generate and scale realistic or real test data from knowledge graphs by simply submitting a user request specifying a desired number of data records for a desired data schema. The schema-based knowledge graph data retrieval system described herein can then generate queries and execute such queries on knowledge graphs to return a desired list of data records for the data schema. The complete process (after submitting the user request) can be performed automatically without human intervention. Similarly, a user can use the technologies described herein to generate realistic or real (and appealing) data records, e.g., from the publicly available knowledge graphs, for customer demonstration purposes without privacy-related concerns. Likewise, a data scientist can use the technologies described herein to easily obtain realistic or real data records matched to a desired data schema for machine learning and/or artificial intelligence purposes.

Example 15—Example Computing Systems

Figure 14:
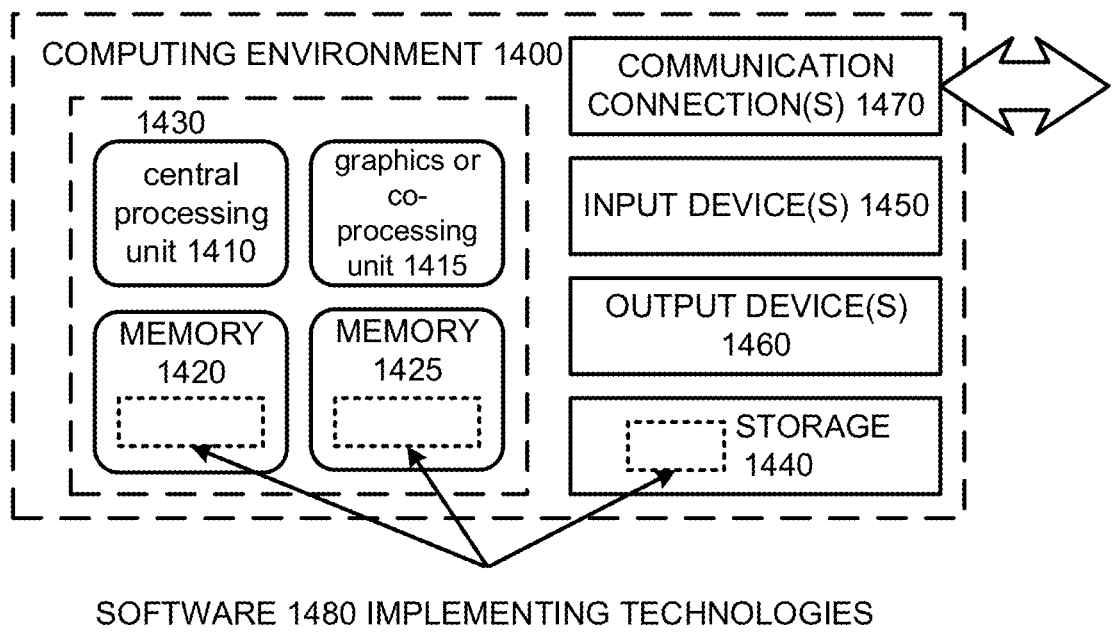
FIG. 14 is a block diagram of an example computing system in which described technologies can be implemented.

FIG. 14 depicts an example of a suitable computing system 1400 in which the described innovations can be implemented. The computing system 1400 is not intended to suggest any limitation as to scope of use or functionality of the present disclosure, as the innovations can be implemented in diverse computing systems.

With reference to FIG. 14, the computing system 1400 includes one or more processing units 1410, 1415 and memory 1420, 1425. In FIG. 14, this basic configuration 1430 is included within a dashed line. The processing units 1410, 1415 can execute computer-executable instructions, such as for implementing the features described in the examples herein. A processing unit can be a general-purpose central processing unit (CPU), processor in an application-specific integrated circuit (ASIC), or any other type of processor. In a multi-processing system, multiple processing units can execute computer-executable instructions to increase processing power. For example, FIG. 14 shows a central processing unit 1410 as well as a graphics processing unit or co-processing unit 1415. The tangible memory 1420, 1425 can be volatile memory (e.g., registers, cache, RAM), non-volatile memory (e.g., ROM, EEPROM, flash memory, etc.), or some combination of the two, accessible by the processing unit(s) 1410, 1415. The memory 1420, 1425 can store software 1480 implementing one or more innovations described herein, in the form of computer-executable instructions suitable for execution by the processing unit(s) 1410, 1415.

A computing system 1400 can have additional features. For example, the computing system 1400 can include storage 1440, one or more input devices 1450, one or more output devices 1460, and one or more communication connections 1470, including input devices, output devices, and communication connections for interacting with a user. An interconnection mechanism (not shown) such as a bus, controller, or network can interconnect the components of the computing system 1400. Typically, operating system software (not shown) can provide an operating environment for other software executing in the computing system 1400, and coordinate activities of the components of the computing system 1400.

The tangible storage 1440 can be removable or non-removable, and can include magnetic disks, magnetic tapes or cassettes, CD-ROMs, DVDs, or any other medium which can be used to store information in a non-transitory way and which can be accessed within the computing system 1400. The storage 1440 can store instructions for the software or method 500 implementing one or more innovations described herein.

The input device(s) 1450 can be an input device such as a keyboard, mouse, pen, or trackball, a voice input device, a scanning device, touch device (e.g., touchpad, display, or the like) or another device that provides input to the computing system 1400. The output device(s) 1460 can be a display, printer, speaker, CD-writer, or another device that provides output from the computing system 1400.

The communication connection(s) 1470 can enable communication over a communication medium to another computing entity. The communication medium can convey information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer, and should not be confused with acts performed by a human being. The actual computer operations corresponding to these terms vary depending on implementation.

Example 16—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example 17—Example Cloud Computing Environment

Figure 15:
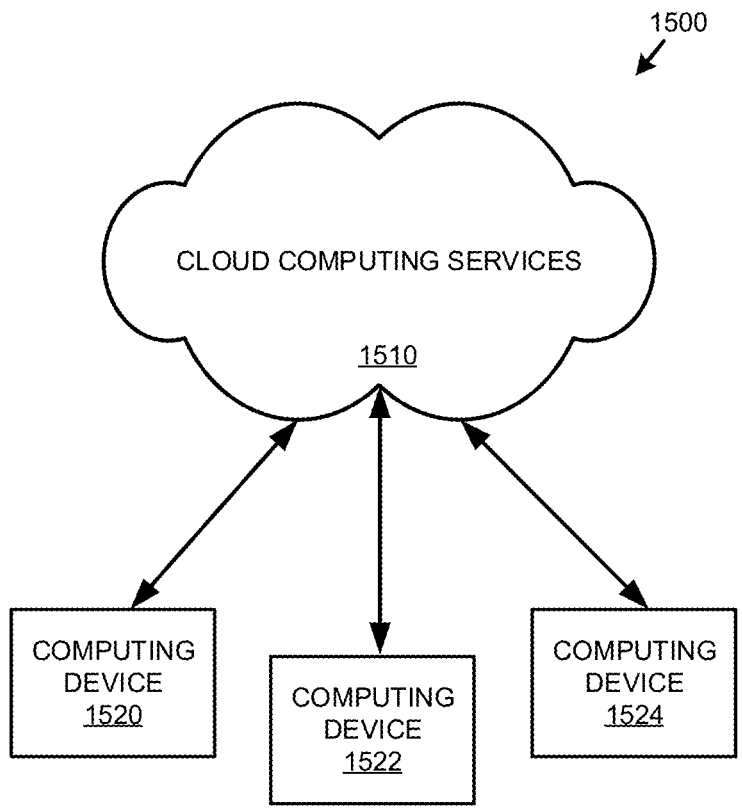
FIG. 15 is a block diagram of an example cloud computing environment that can be used in conjunction with the technologies described herein.

FIG. 15 depicts an example cloud computing environment 1500 in which the described technologies can be implemented, including, e.g., the system disclosed above and other systems herein. The cloud computing environment 1500 can include cloud computing services 1510. The cloud computing services 1510 can comprise various types of cloud computing resources, such as computer servers, data storage repositories, networking resources, etc. The cloud computing services 1510 can be centrally located (e.g., provided by a data center of a business or organization) or distributed (e.g., provided by various computing resources located at different locations, such as different data centers and/or located in different cities or countries).

The cloud computing services 1510 can be utilized by various types of computing devices (e.g., client computing devices), such as computing devices 1520, 1522, and 1523. For example, the computing devices (e.g., 1520, 1522, and 1524) can be computers (e.g., desktop or laptop computers), mobile devices (e.g., tablet computers or smart phones), or other types of computing devices. For example, the computing devices (e.g., 1520, 1522, and 1524) can utilize the cloud computing services 1510 to perform computing operations (e.g., data processing, data storage, and the like).

In practice, cloud-based, on-premises-based, or hybrid scenarios can be supported.

Example 18—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

As described in this application and in the claims, the singular forms "a," "an," and "the" include the plural forms unless the context clearly dictates otherwise. Additionally, the term "includes" means "comprises." Further, "and/or" means "and" or "or," as well as "and" and "or."

Example 19—Example Embodiments

Any of the following embodiments can be implemented.

Clause 1. A computer-implemented method comprising: receiving a request of data records for a data schema; obtaining a schema alignment which maps the data schema to a subset of an ontology of a knowledge graph; generating at least one query based on the subset of the ontology of the knowledge graph; obtaining a list of data records, wherein the obtaining comprises executing the at least one query on the knowledge graph to obtain a list of data records; and persisting the list of data records to the data schema.

Clause 2. The method of clause 1, wherein obtaining the schema alignment comprises checking an alignment repository; and responsive to finding the schema alignment in the alignment repository, retrieving the schema alignment from the alignment repository.

Clause 3. The method of clause 2, wherein obtaining the schema alignment comprises: running a schema matching operation to determine the schema alignment if the request specifies not to check the alignment repository; and storing the schema alignment in the alignment repository.

Clause 4. The method of any one of clauses 1-3, wherein generating the at least one query comprises constructing a basic graph pattern, wherein the basic graph pattern comprises a triple pattern comprising a class or property defined in the subset of the ontology of the knowledge graph, wherein the schema alignment maps an attribute of the data schema to the class or property.

Clause 5. The method of clause 4, wherein the basic graph pattern comprises a plurality of triple patterns comprising respective classes or properties defined in the subset of the ontology of the knowledge graph, wherein the schema alignment maps a plurality of attributes of the data schema to the respective classes or properties.

Clause 6. The method of any one of clauses 1-5, further comprising composing the list of data records, wherein the composing comprises combining query results returned after executing a plurality of queries, wherein the plurality of queries are configured to return respective query results corresponding to different attributes of the data schema, wherein the schema alignment maps different attributes of the data schema to respective classes or properties defined in the subset of the ontology of the knowledge graph.

Clause 7. The method of any one of clauses 1-6, further comprising duplicating one or more data records before persisting the list of data records to the data schema.

Clause 8. The method of any one of clauses 1-7, further comprising ranking the list of data records before persisting the list of data records to the data schema.

Clause 9. The method of clause 8, wherein ranking the list of data records is based on completeness of the data records and/or duplicate status of the data records.

Clause 10. The method of any one of clauses 1-9, further comprising: when a count of the data records is smaller than a desired number specified in the request, determining a new subset of the ontology of the knowledge graph, wherein at least one class or property defined in the new subset of the ontology is a subtype of a class or property defined in the subset of the ontology; generating at least one new query based on the new subset of the ontology of the knowledge graph; executing the at least one new query on the knowledge graph to obtain a new list of data records; and persisting the new list of data records to the data schema.

Clause 11. A computing system comprising: memory; one or more hardware processors coupled to the memory; and one or more computer readable storage media storing instructions that, when loaded into the memory, cause the one or more hardware processors to perform operations comprising: receiving a request of data records for a data schema; obtaining a schema alignment which maps the data schema to a subset of an ontology of a knowledge graph; generating at least one query based on the subset of the ontology of the knowledge graph; obtaining a list of data records, wherein the obtaining comprises executing the at least one query on the knowledge graph to obtain a list of data records; and persisting the list of data records to the data schema.

Clause 12. The system of clause 11, further comprising an alignment repository which stores previously generated schema alignments which map a plurality of data schemas to respective subsets of ontologies of one or more knowledge graphs.

Clause 13. The system of any one of clauses 11-12, further comprising a schema matcher configured to generate the schema alignment at runtime based on the data schema and the ontology of the knowledge graph.

Clause 14. The system of any one of clauses 11-13, wherein the at least one query comprises a basic graph pattern, wherein the basic graph pattern comprises a triple pattern comprising a class or property defined in the subset of the ontology of the knowledge graph, wherein the schema alignment maps an attribute of the data schema to the class or property.

Clause 15. The system of clause 14, wherein the basic graph pattern comprises a plurality of triple patterns comprising respective classes or properties defined in the subset of the ontology of the knowledge graph, wherein the schema alignment maps a plurality of attributes of the data schema to the respective classes or properties.

Clause 16. The system of any one of clauses 11-15, wherein the operations further comprise composing the list of data records, wherein the composing comprises combining query results returned after executing a plurality of queries, wherein the plurality of queries are configured to return respective query results corresponding to different attributes of the data schema, wherein the schema alignment maps different attributes of the data schema to respective classes or properties defined in the subset of the ontology of the knowledge graph.

Clause 17. The system of any one of clauses 11-16, wherein the operations further comprise duplicating one or more data records before persisting the list of data records to the data schema.

Clause 18. The system of any one of clauses 11-17, wherein the operations further comprise ranking the list of data records before persisting the list of data records to the data schema Clause 19. The system of clause 18, wherein ranking the list of data records is based on completeness of the data records and/or duplicate status of the data records.

Clause 20. One or more computer-readable media having encoded thereon computer-executable instructions causing one or more processors to perform a method comprising: receiving a request of data records for a data schema; obtaining a schema alignment which maps the data schema to a subset of an ontology of a knowledge graph, wherein the schema alignment is obtained from an alignment repository or generated at runtime by a schema matcher; generating at least one query with the subset of the ontology of the knowledge graph; obtaining a list of data records, wherein the obtaining comprises executing the at least one query on the knowledge graph to obtain a list of data records; and persisting the ranked list of data records to the data schema; wherein generating the at least one query comprises constructing a basic graph pattern, wherein the basic graph pattern comprises a triple pattern including a class or property defined in the subset of the ontology of the knowledge graph, wherein the schema alignment maps an attribute of the data schema to the class or property.

Example 20—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

The invention claimed is:

1. A computer-implemented method comprising:
receiving a request of data records for a data schema;
obtaining a schema alignment which maps the data schema to a subset of an ontology of a knowledge graph;
generating one or more queries based on the subset of the ontology of the knowledge graph;
executing the one or more queries on the knowledge graph;
composing a list of data records by combining query results returned after executing the one or more queries; and
persisting the list of data records to the data schema,
wherein a selected query comprises a triple pattern including a class or property defined in the subset of the ontology of the knowledge graph, wherein the schema alignment maps an attribute of the data schema to the class or property,
wherein the one or more queries are configured to return respective query results corresponding to one or more attributes of the data schema, wherein the schema alignment maps the one or more attributes of the data schema to respective classes or properties defined in the subset of the ontology of the knowledge graph.

2. The method of claim 1, wherein obtaining the schema alignment comprises checking an alignment repository; and responsive to finding the schema alignment in the alignment repository, retrieving the schema alignment from the alignment repository.

3. The method of claim 2, wherein obtaining the schema alignment comprises:
running a schema matching operation to determine the schema alignment if the request specifies not to check the alignment repository; and
storing the schema alignment in the alignment repository.

4. The method of claim 1, wherein the triple pattern comprises a subject, a predicate, and an object, at least one of which is a variable.

5. The method of claim 1, wherein the selected query comprises a plurality of triple patterns comprising respective classes or properties defined in the subset of the ontology of the knowledge graph, wherein the schema alignment maps a plurality of attributes of the data schema to the respective classes or properties.

6. The method of claim 1, further comprising duplicating one or more data records before persisting the list of data records to the data schema.

7. The method of claim 1, further comprising ranking the list of data records before persisting the list of data records to the data schema.

8. The method of claim 7, wherein ranking the list of data records is based on completeness of the data records or duplicate status of the data records.

9. The method of claim 1, further comprising: when a count of the data records is smaller than a desired number specified in the request,
determining a new subset of the ontology of the knowledge graph, wherein at least one class or property defined in the new subset of the ontology is a subtype of a class or property defined in the subset of the ontology;

generating at least one new query based on the new subset of the ontology of the knowledge graph;

executing the at least one new query on the knowledge graph to obtain a new list of data records; and persisting the new list of data records to the data schema.

10. A computing system comprising:

memory;

one or more hardware processors coupled to the memory; and one or more computer readable storage media storing instructions that, when loaded into the memory, cause the one or more hardware processors to perform operations comprising:

receiving a request of data records for a data schema;

obtaining a schema alignment which maps the data schema to a subset of an ontology of a knowledge graph;

generating one or more queries based on the subset of the ontology of the knowledge graph;

executing the one or more queries on the knowledge graph;

composing a list of data records by combining query results returned after executing the one or more queries; and persisting the list of data records to the data schema, wherein a selected query comprises a triple pattern including a class or property defined in the subset of the ontology of the knowledge graph, wherein the schema alignment maps an attribute of the data schema to the class or property, wherein the one or more queries are configured to return respective query results corresponding to one or more attributes of the data schema, wherein the schema alignment maps the one or more attributes of the data schema to respective classes or properties defined in the subset of the ontology of the knowledge graph.

11. The system of claim 10, further comprising an alignment repository which stores previously generated schema alignments which map a plurality of data schemas to respective subsets of ontologies of one or more knowledge graphs.

12. The system of claim 10, further comprising a schema matcher configured to generate the schema alignment at runtime based on the data schema and the ontology of the knowledge graph.

13. The system of claim 10, wherein the triple pattern comprises a subject, a predicate, and an object, at least one of which is a variable.

14. The system of claim 10, wherein the selected query comprises a plurality of triple patterns comprising respective classes or properties defined in the subset of the ontology of the knowledge graph, wherein the schema alignment maps a plurality of attributes of the data schema to the respective classes or properties.

15. The system of claim 10, wherein the operations further comprise duplicating one or more data records before persisting the list of data records to the data schema.

16. The system of claim 10, wherein the operations further comprise ranking the list of data records before persisting the list of data records to the data schema.

17. The system of claim 16, wherein ranking the list of data records is based on completeness of the data records or duplicate status of the data records.

18. One or more non-transitory computer-readable media having encoded thereon computer-executable instructions causing one or more processors to perform a method comprising:

receiving a request of data records for a data schema;

obtaining a schema alignment which maps the data schema to a subset of an ontology of a knowledge graph, wherein the schema alignment is obtained from an alignment repository or generated at runtime by a schema matcher;

generating one or more queries based on the subset of the ontology of the knowledge graph;

executing the one or more queries on the knowledge graph;

composing a list of data records by combining query results returned after executing the one or more queries; and persisting the list of data records to the data schema;

wherein a selected query comprises a triple pattern including a class or property defined in the subset of the ontology of the knowledge graph, wherein the schema alignment maps an attribute of the data schema to the class or property, wherein the one or more queries are configured to return respective query results corresponding to one or more attributes of the data schema, wherein the schema alignment maps the one or more attributes of the data schema to respective classes or properties defined in the subset of the ontology of the knowledge graph.

* * * * *